(12) United States Patent
Matsunaga

(10) Patent No.: US 11,938,962 B2
(45) Date of Patent: Mar. 26, 2024

(54) DRIVER SUPPORT SERVER AND SYSTEM

(71) Applicant: TOYOTA JIDOSHA KABUSHIKI KAISHA, Toyota (JP)

(72) Inventor: Issei Matsunaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 17/648,230

(22) Filed: Jan. 18, 2022

(65) Prior Publication Data

US 2022/0324479 A1 Oct. 13, 2022

(30) Foreign Application Priority Data

Jan. 13, 2021 (JP) .................... 2021-003326

(51) Int. Cl.
*B60W 60/00* (2020.01)
*B60W 30/06* (2006.01)

(52) U.S. Cl.
CPC .......... *B60W 60/001* (2020.02); *B60W 30/06* (2013.01); *B60W 60/0059* (2020.02)

(58) Field of Classification Search
CPC ............... B60W 60/001; B60W 30/06; B60W 60/0059; G08G 1/166; G08G 1/168
See application file for complete search history.

(56) References Cited

U.S. PATENT DOCUMENTS

| 2016/0180547 | A1* | 6/2016 | Pham | ............... | H04N 7/183 |
| | | | | | 382/103 |
| 2019/0189006 | A1* | 6/2019 | Toma | ............... | G08G 1/09 |
| 2020/0074859 | A1 | 3/2020 | Eshima | | |
| 2020/0207368 | A1* | 7/2020 | Takagi | ............... | G05D 1/0088 |
| 2020/0311783 | A1* | 10/2020 | Noguchi | ............... | G08G 1/065 |
| 2021/0129834 | A1* | 5/2021 | Gier | ............... | G05D 1/0088 |
| 2021/0405646 | A1* | 12/2021 | Park | ............... | G05D 1/0234 |
| 2022/0316892 | A1* | 10/2022 | Takanohashi | .... | G08G 1/096811 |

FOREIGN PATENT DOCUMENTS

| JP | 2013174540 A | 9/2013 | |
| JP | 2020035071 A | 3/2020 | |
| WO | WO-2016072082 A1 * | 5/2016 | ........ B60W 50/0098 |

OTHER PUBLICATIONS

A. Gheorghiu, V. Iordache and A. C. Cormos, "Laboratory development of an autonomic parking management system," 2016 International Conference on Applied and Theoretical Electricity (ICATE), Craiova, Romania, 2016, pp. 1-6 (Year: 2016).*

* cited by examiner

*Primary Examiner* — Khoi H Tran
*Assistant Examiner* — Dairon Estevez
(74) *Attorney, Agent, or Firm* — Dickinson Wright, PLLC

(57) ABSTRACT

A server of a driving support system includes a path setting unit configured to set a first traveling path in which a vehicle travels in a parking lot, a detecting unit configured to detect a person, and a determining unit configured to determine whether or not a person is present in a part of the first traveling path, based on the detection result of the detecting unit. When it is determined that a person is present for a predetermined time or more in the part of the first traveling path, the path setting unit searches for a second traveling path that is a path that bypasses the part of the first traveling path, and the detecting unit limits the processing for the measurement result of the sensor whose measurement target is the part of the first traveling path after the second traveling path is searched.

8 Claims, 4 Drawing Sheets

DRIVER SUPPORT SERVER AND SYSTEM

CROSS-REFERENCE TO RELATED APPLICATIONS

This application is based upon and claims the benefit of priority of the prior Japanese Patent Application No. 2021-003326, filed on Jan. 13, 2021, the entire contents of which are incorporated herein by reference.

BACKGROUND

1. Technical Field

The present disclosure relates to a technical field of a driving support server and system for supporting a traveling of a vehicle in a parking lot.

2. Description of the Related Art

For the purpose of improving a safety of movement of people and vehicles in a parking lot, for example, a device for detecting pedestrians and vehicles or the like present in the parking lot by a camera or a laser sensor has been proposed (see JP 2020-035071 A). As another related technique, when a pedestrian is detected from a captured image by a vehicle-mounted camera, a device for searching a path, in which probability of encountering the pedestrian is low, has been proposed (see JP 2013-174540 A).

As the number of sensors installed in the parking lot increases, the blind spot decreases, so the safety of the parking lot is improved. On the other hand, as the number of sensors increases, the load on a system for detecting pedestrians or the like from measurement results of sensors increases. Therefore, the larger the number of sensors, the higher a processing performance device is required.

SUMMARY

The present disclosure has been made in view of the above circumstances. An object of the present disclosure is to provide a driving support server and a system capable of reducing a processing load without reducing the number of sensors.

A driving support server according to an aspect of the present disclosure is a driving support server for supporting a traveling of a vehicle to enter a parking space of a parking lot or to move out from the parking space. The driving support server includes: a path setting unit configured to set a first traveling path in which the vehicle travels in the parking lot; a detecting unit configured to detect a person by performing processing on a measurement result of one or more sensors provided in the parking lot; and a determining unit configured to determine whether or not a person is present for a predetermined time or more in a part of the first traveling path, based on the detection result of the detecting unit, wherein the path setting unit searches a second traveling path that is a path that bypasses the part of the first traveling path, when it is determined that there is a person in the part of the first traveling path, and the detecting unit limits the processing for the measurement result of the sensor, whose measurement target is the part of the first traveling path, after the second traveling path is searched.

A driving support system according to an aspect of the present disclosure is a driving support system for supporting a traveling of the vehicle to enter a parking space of a parking lot or to move out from the parking space. The driving support system includes: one or more sensors provided in the parking lot; and a server, the server includes a path setting unit configured to set a first traveling path, in which the vehicle travels in the parking lot, a detecting unit configured to detect a person by performing processing on a measurement result of the one or more sensors, and a determining unit configured to determine whether or not a person is present for a predetermined time or more in a part of the first traveling path, based on the detection result of the detecting unit, wherein the path setting unit searches a second traveling path that is a path to bypass the part of the first traveling path, when it is determined that the person is present for a predetermined time or more in the part of the first traveling path, and the detecting unit limits the processing for the measurement result of the sensor, whose measurement target is the part of the first traveling path, after the second traveling path is searched.

DETAILED DESCRIPTION OF THE EMBODIMENT

Figure 1:
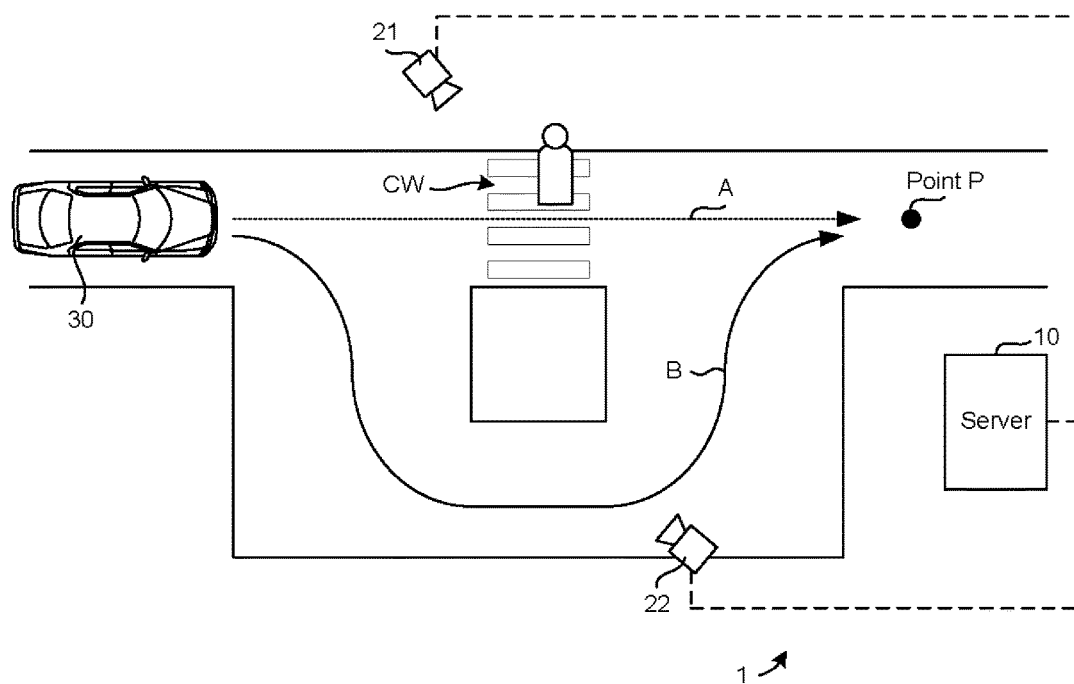
FIG. 1 is a diagram showing an outline of a driving support system according to an embodiment of the present disclosure.
Figure 2:
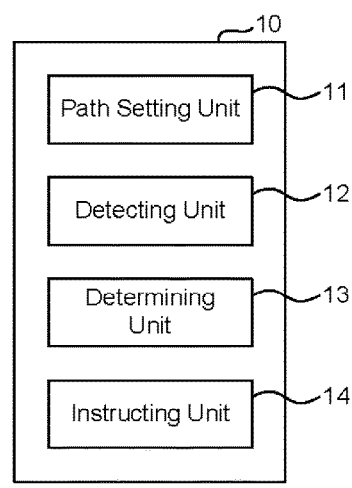
FIG. 2 is a block diagram showing a configuration of a server provided in the driving support system according to an embodiment of the present disclosure.
Figure 3:
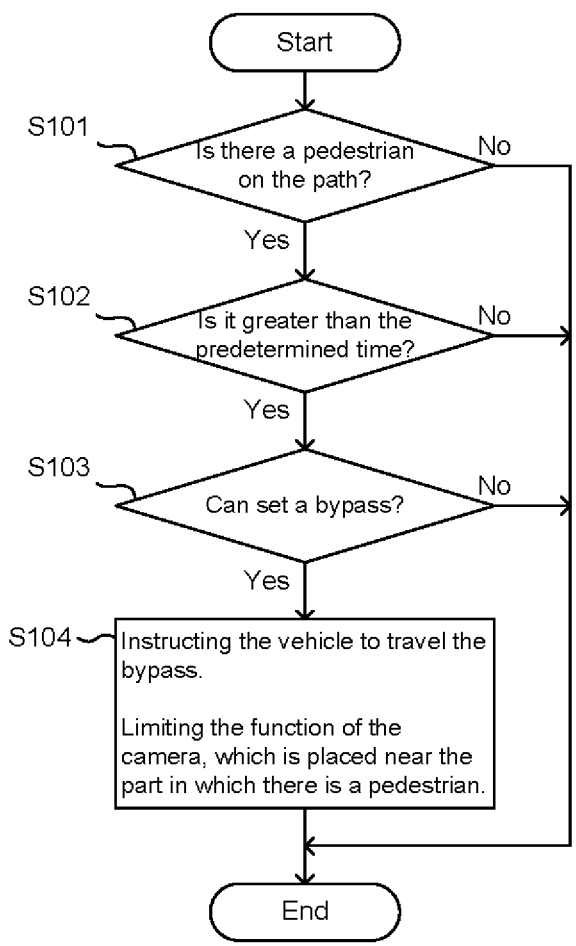
FIG. 3 is a flowchart showing an operation of the driving support system according to an embodiment of the present disclosure.

An exemplary embodiment according to a driving support system will be described with reference to FIGS. 1 to 3. The driving support system 1 according to the embodiment includes a server 10, and cameras 21 and 22 provided in a parking lot. The parking lot shown in FIG. 1 includes a passageway with pedestrian crossing CW and a passageway without pedestrian crossing CW. The camera 21 is installed to be capable of photographing at least a part of the passageway where the pedestrian crossing CW is located. The camera 22 is installed to be capable of photographing at least a part of a passageway without a pedestrian crossing CW.

Incidentally, the driving support system 1, in addition to cameras 21 and 22, may be provided with another camera. That is, the driving support system 1 may include three or more cameras. The driving support system 1 may also include sensors that differ from cameras, such as radar sensors and LiDAR (Light Detection and Ranging), in addition to or in place of cameras 21 and 22.

The server 10 will be described with reference to FIG. 2. In FIG. 2, the server 10 includes a path setting unit 11, a detecting unit 12, a determining unit 13 and an instructing unit 14. Each of the path setting unit 11, the detecting unit 12, the determining unit 13 and the instructing unit 14 may be a processing circuit that is realized physically. Alternatively, each of the path setting unit 11, the detecting unit 12, the determining unit 13 and the instructing unit 14 may be a processing block to be realized theoretically, or in a generalized processor capable of executing stored computer readable instructions.

In the driving support system 1, the server 10 gives information and instructions to a vehicle to be parked in a parking space of the parking lot, and to a vehicle to be moved out of a parking space. That is, the server 10 may function, for example, as a control device. The information given from the server 10 to the vehicle includes, for example, a position of the parking space to be stored, a path to the parking space, a path to travel at the time of unloading, and the like. Further, an instruction given from the server 10 to the vehicle may include, for example, parking/moving out start, temporary stop, parking/moving out stop, and the like.

In the present embodiment, the case where the server 10 gives information and instructions to the vehicle 30 will be described. The vehicle 30 is assumed to be a vehicle having an automatic driving function. Then, the vehicle 30, with the automatic driving function, is assumed to travel in the parking lot. The vehicle 30 is assumed to move from the current position in FIG. 1 to the point P. Incidentally, the vehicle 30 may be traveling in the parking lot for parking, or it may be traveling in the parking lot for leaving a parking spot.

Incidentally, in the parking lot, in order to secure as much as possible the parking space, the width of the passageway, in which the vehicle travels, is often relatively narrow. Therefore, when there are parked vehicles, a range capable of detecting the pedestrian of a vehicle-mounted sensor of the vehicle, which travels through the passageway, becomes relatively narrow. Therefore, the driving support system 1 improves the safety of the parking lot by monitoring the passage by each camera 21 and 22.

The path setting unit 11 of the server 10 sets a path in which the vehicle 30 travels. The path setting unit 11 sets a first path indicated by the dotted arrow A in FIG. 1, as a path, in which the vehicle 30 travels. The path setting unit 11 transits the information relating to the set first path to the vehicle 30 via the instructing unit 14.

The detecting unit 12 of the server 10 performs predetermined image processing on images captured by cameras 21 and 22, respectively, to detect a pedestrian. Incidentally, regarding the detection method of the pedestrian, it is possible to apply the existing various aspects. Details of the detection method of the pedestrian will be omitted for clarity and conciseness, as any suitable detection method is acceptable.

The determining unit 13 of the server 10 acquires information relating to the first path from the path setting unit 11 and the detection result of the detecting unit 12. The determining unit 13 determines whether or not a pedestrian is present on the first path based on the detection result of the detecting unit 12. In the present embodiment, it is determined that a pedestrian is present on the first path when a pedestrian is detected from an image taken by the camera 21.

If it is determined that a pedestrian is present on the first path, the determining unit 13 further determines whether or not the pedestrian is present continuously for a predetermined time or more on the first path based on the detection result of the detecting unit 12. In the present embodiment, it is determined that the pedestrian is continuously present on the first path for a predetermined time or more when the pedestrian is continuously detected for a predetermined time or more from the image taken by the camera 21. In this case, the same pedestrian may not be detected continuously for a predetermined time or more.

If it is determined that the pedestrian on the first path is present continuously for a predetermined time or more, the determining unit 13 transmits the determination result to the path setting unit 11. The path setting unit 11, which acquires the determination result, searches for a detour path that bypasses a part corresponding to the photographing range of the camera 21 (here, near the pedestrian crossing CW) of the first path. It is assumed that the path setting unit 11 sets the second path indicated by the arrow B in FIG. 1 as a detour path of the vehicle 30. The path setting unit 11 transmits the information relating to the set second path to the vehicle 30 via the instructing unit 14.

The path setting unit 11 transmits information that sets the detour path of the vehicle 30 to the determining unit 13. The determining unit 13, which has acquired the information, temporarily stops that a predetermined image processing is performed on the image captured by the camera 21 by transmitting a predetermined instruction to the detecting unit 12.

The above-described the "predetermined time" is a value for determining whether or not to cause the path setting unit 11 to search for a detour path. The predetermined time may be set in advance as a fixed value, it may be set as a variable value according to some physical quantity or parameter. Specifically, one example of how the predetermined time may be set as follows: obtain statistical data of the time (e.g., the time across the pedestrian crossing CW) during which one pedestrian stays on the passageway of the parking lot; obtain the mean and standard deviation from the statistical data; and a value obtained by adding a value three times the standard deviation to the average value may be set as the "predetermined time" above.

Incidentally, when it is determined that there is no pedestrian on the first path, or when it is determined that there is no pedestrian continuously for a predetermined time or more on the first path, the determining unit 13 may not perform special processing. Alternatively, in this case, the determining unit 13 may inform to the vehicle 30 that the first path is safe.

The operation of the driving support system 1 is described with reference to the flowchart of FIG. 3. The determining unit 13 acquires the information relating to the first path from the path setting unit 11 and the detection result of the detecting unit 12. Subsequently, the determining unit 13 determines whether or not a pedestrian is present on the first path based on the detection result of the detecting unit 12 (step S101).

In the process of the step S101, if it is determined that there is no pedestrian on the first path (step S101: No), the operation shown in FIG. 3 is terminated. In this case, the process of the step S101 may be performed again. That is, the operation shown in FIG. 3 may be repeated at a predetermined cycle.

In the processing of the step S101, if it is determined that a pedestrian is present on the first path (step S101: Yes), the determining unit 13 determines whether or not the pedestrian is present continuously for a predetermined time or more on the first path based on the detection result of the detecting unit 12 (step S102). In the process of the step S102, if it is determined that the pedestrian is not continuously present for a predetermined time or more on the first path (step S102: No), the operation shown in FIG. 3 is terminated. In this case, the process of the step S101 may be performed again.

In the processing of the step S102, if it is determined that the pedestrian on the first path is continuously present for a predetermined time or more (step S102: Yes), the determining unit 13 transmits the determination result to the path setting unit 11. The path setting unit 11, which acquires the determination result, searches for a detour path. Thereafter, the determining unit 13 determines whether or not the detour path can be set based on the search result of the path setting unit 11 (step S103).

In the process of the step S103, if it is determined that the detour path can not be set (step S103: No), the operation shown in FIG. 3 is terminated. In this case, the process of the step S101 may be performed again. In this case, the vehicle 30 may travel along the first path and decelerate or pause near the pedestrian crossing CW, for example.

In the process of the step S103, if it is determined that the detour path can be set (step S103: Yes), the determining unit 13 transmits a predetermined instruction to the detecting unit 12 (step S104). As a result, the detecting unit 12 temporarily stops performing image processing on the image captured by the camera 21. At this time, the path setting unit 11 transmits the information relating to the second path (i.e., detour path) to the vehicle 30 via the instructing unit 14.

Technical Effects

When a pedestrian is detected by performing predetermined image processing on an image, the calculation load related to image processing may increase depending on the size and number of pedestrians in the image. Further, in order to improve the safety of the parking lot, as the number of cameras increases, the calculation load relating to the image processing increases since the information to be processed at the same time increases. Depending on the processing power of a device, which corresponds to the detecting unit 12 of the server 10, it may be difficult for the device to perform image processing in real time when the calculation load increases. An equipment with sufficiently high throughput is relatively expensive. Then, introducing a system, which corresponds to the driving support system 1, may not be proceed.

Therefore, in the driving support system 1, for example, if it is determined that a pedestrian presents continuously for a predetermined time or more on the first path of the vehicle 30, and, if it is determined that the detour path can be set, the detecting unit 12 temporarily stops the image processing for the image taken by the camera 21. With this configuration, it is possible to reduce the calculation load of the detecting unit 12. In particular, since the image processing for the image of the camera 21 that captures the pedestrian is temporarily stopped, the reduction effect of the calculation load of the detecting unit 12 is relatively large. That is, according to the driving support system 1, without reducing the number of cameras (i.e., sensors), it is advantageously possible to reduce the processing load.

As a result, even if the processing power of the detecting unit 12 is not so high, it is possible to realize a driving support system 1. In other words, it is possible to provide the driving support system 1 at a relatively low cost. Incidentally, even when configured in this way, the vehicle 30 does not travel a part corresponding to the photographing range of the camera 21, there is no safety problem.

First Modification

Figure 4:
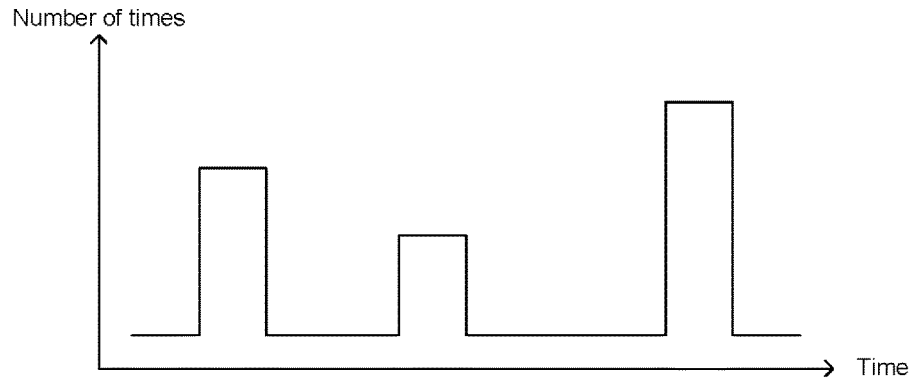
FIG. 4 is a diagram showing an example of a time change of the number of shutdowns of the camera.
Figure 5:
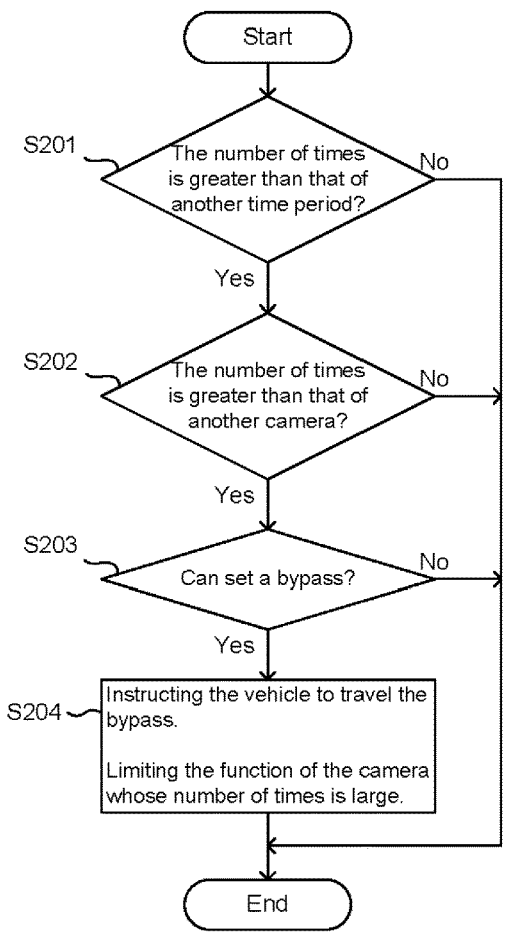
FIG. 5 is a flowchart showing the operation of the driving support system according to a first modification of an embodiment of the present disclosure.

It will be described with reference to FIGS. 4 and 5 for a first modification of the embodiment according to the driving support system. Incidentally, the first modification is not intended to compete with the embodiment described above.

In other words, the embodiment described above and the first modification described below can be realized at the same time.

In the first modification, the detecting unit 12 counts the number of times that the execution of the image processing is temporarily interrupted (hereinafter, as appropriate, referred to as "shutdown number"). The detecting unit 12 counts the number of shutdowns for each of cameras 21 and 22. As a result, for example, information indicating the time change of the number of shutdowns shown in FIG. 4 is obtained.

The operation of the driving support system 1 according to the first modification is described with reference to the flowchart of FIG. 5. First, it is described about processes after the step S201 for the camera 21. Thereafter, it is described about processes after the step S201 for the camera 22.

Before that the path setting unit 11 sets a path in which the vehicle 30 travels, the determining unit 13 determines whether or not the number of shutdowns in a time zone, when the current time belongs, is larger than the other time zone (step S201). At this time, the determining unit 13 performs the above determination for the camera 21 based on the information indicating the time change of the number of shutdowns according to the camera 21.

The determining unit 13, for example, may determine that the number of shutdown in the time zone, when the current time belongs, is larger than the other time zone when the difference in the number of shutdowns between the time zone, when the current time belongs, and the time zone immediately before or immediately after that is equal to or greater than the first predetermined value.

In the process of the step S201, if it is determined that the number of shutdowns in the time zone, when the current time belongs, is not more than the other time zone (step S201: No), the operation shown in FIG. 5 is terminated. In this case, the process of the step S201 may be performed again. That is, the operation shown in FIG. 5 may be repeated at a predetermined cycle.

In the processing of the step S201, if it is determined that the time zone, when the current time belongs, has a larger number of shutdowns than the other time zones (Step S201: Yes), the determining unit 13 determines whether or not the shutdown number of the camera 21 is larger than the shutdown number of the camera 22 in the time zone, when the current time belongs (Step S202).

The determining unit 13, for example, may determine that the number of shutdowns of the camera 21 is larger than the number of shutdowns of the camera 22 when the difference between the number of shutdowns of the camera 21 and the number of shutdowns of the camera 22 is equal to or greater than the second predetermined value.

In the process of the step S202, if it is determined that the number of shutdowns of the camera 21 is not more than the number of shutdowns of the camera 22 (step S202: No), the operation shown in FIG. 5 is terminated. In this case, the process of the step S201 may be performed again.

In the process of the step S202, if it is determined that the number of shutdowns of the camera 21 is larger than the number of shutdowns of the camera 22 (step S202: Yes), the determining unit 13 transmits the determination result to the path setting unit 11. The path setting unit 11, which acquires the determination result, searches for a detour path that bypasses a part corresponding to the photographing range of the camera 21 of the parking lot. Thereafter, the determining unit 13 determines whether or not the detour path can be set based on the search result of the path setting unit 11 (step S203).

In the process of the step S203, if it is determined that the detour path can not be set (step S203: No), the operation shown in FIG. 5 is terminated. In this case, the process of the step S201 may be performed again.

In the process of the step S203, if it is determined that the detour path can be set (step S203: Yes), the determining unit 13 transmits a predetermined instruction to the detecting unit 12 (step S204). As a result, the detecting unit 12 temporarily stops performing image processing on the image captured by the camera 21. At this time, the path setting unit 11, for example, transmits the information relating to the second path indicated by the arrow B in FIG. 1 (i.e., detour path), to the vehicle 30 via the instructing unit 14.

The determining unit 13 performs the process of the above-described step S201 for the camera 22 based on the information indicating the time change of the number of shutdowns according to the camera 22. In the process of the step S201, if it is determined that the time zone, when the current time belongs, has a larger number of shutdowns than the other time zones (step S201: Yes), the determining unit 13 determines whether or not the shutdown number of the camera 22 is larger than the shutdown number of the camera 21 in the time zone, when the current time belongs (step S202).

In the process of the step S202, if it is determined that the number of shutdowns of the camera 22 is larger than the number of shutdowns of the camera 21 (step S202: Yes), the determining unit 13 transmits the determination result to the path setting unit 11. The path setting unit 11, which acquires the determination result, searches for a detour path that bypasses a part corresponding to the photographing range of the camera 22 of the parking lot. Thereafter, the determining unit 13 determines whether or not the detour can be set based on the search result of the path setting unit 11 (step S203).

In the process of the step S203, if it is determined that the detour path can be set (step S203: Yes), the determining unit 13 transmits a predetermined instruction to the detecting unit 12 (step S204). As a result, the detecting unit 12 temporarily stops performing image processing on the image captured by the camera 22. At this time, the path setting unit 11, for example, transmits information relating to the first path indicated by the dotted arrow A in FIG. 1 (i.e., detour path) to the vehicle 30 via the instructing unit 14.

Second Modification

A second modification is described with reference to a flowchart of FIG. 6 which describes a second modification of the embodiment according to the driving support system. Incidentally, the process of the step S101~S104 of the flowchart of FIG. 6 is the same as the process of the step S101~S104 of the embodiment described above, a description thereof will be omitted for conciseness and clarify.

Figure 6:
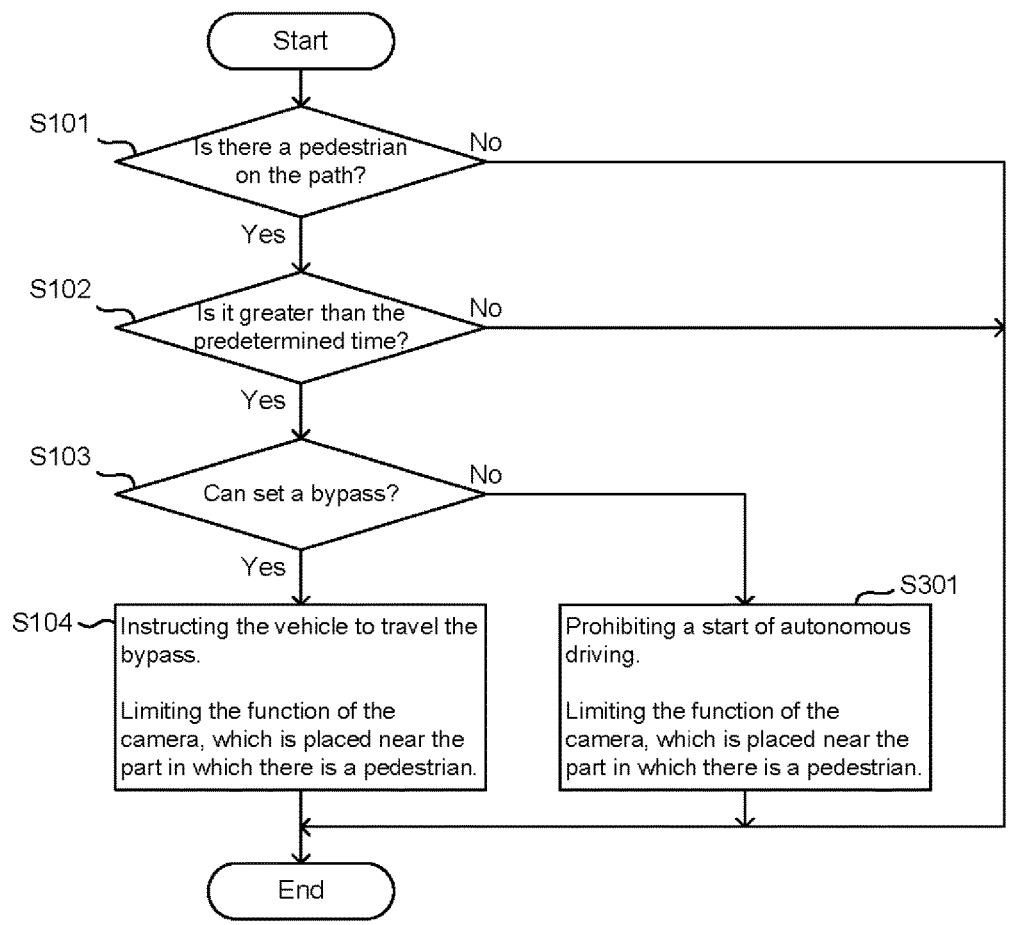
FIG. 6 is a flowchart showing the operation of the driving support system according to a second modification of an embodiment of the present disclosure.

In the process of the step S103 of FIG. 6, when it is determined that the detour path can not be set (step S103: No), the determining unit 13 transmits information indicating prohibition of the start of the driving by the automatic driving function to the vehicle 30 via the instructing unit 14 (step S301). Further, the determining unit 13 transmits a predetermined instruction to the detecting unit 12. As a result, the detecting unit 12 temporarily stops performing image processing on the image captured by the camera 21.

Various aspects of the invention derived from the embodiments and modifications described above will be described below.

A driving support server according to an aspect of the disclosure is a driving support server for supporting a traveling of a vehicle to enter a parking space of a parking lot or to move out from the parking space. The driving support server includes: a path setting unit configured to set the first traveling path, in which the vehicle travels in the parking lot; a detecting unit configured to detect a person by performing processing on a measurement result of one or more sensors provided in the parking lot; and a determining unit configured to determine whether or not a person is present for a predetermined time or more in a part of the first traveling path, based on the detection result of the detecting unit, wherein the path setting unit searches a second traveling path that is a path that bypasses the part of the first traveling path when it is determined that there is a person in the part of the first traveling path, and the detecting unit limits the processing for the measurement result of the sensor, whose measurement target is the part of the first traveling path, after the second traveling path is searched.

In the above-described embodiment, the "server 10" corresponds to an example of the "driving support server", "cameras 21 and 22" correspond to an example of the "sensor", and the "image" corresponds to an example of the "measurement result".

The detecting unit may count the number of times the processing is limited for the measurement result of the sensor, whose measurement target is the part of the first traveling path, and the path setting unit may set a path to bypass the part of the first traveling path, in a period in which the number of times counted satisfies a predetermined condition, without setting the first path.

The vehicle may have an automatic driving function, the driving support server may include a prohibiting unit configured to instruct the prohibition of the traveling the first traveling path by the automatic driving function to the vehicle, if there is no path corresponding to the second travel path, and the detecting unit may limit the processing for the measurement result of the sensor, whose measurement target is the part of the first traveling path, after the prohibiting unit instructing the prohibition of the first travel path to the vehicle. In the above-described embodiment, the "determining unit 13" corresponds to an example of the "prohibiting unit".

A driving support system according to an aspect of the invention is a driving support system for supporting a traveling of a vehicle to enter a parking space of a parking lot or to move out from the parking space. The driving system includes: one or more sensors provided in the parking lot; and a server, the server includes a path setting unit configured to set a first traveling path, in which the vehicle travels in the parking lot, a detecting unit configured to detect a person by performing processing on the measurement result of the one or more sensors, and a determining unit configured to determine whether or not a person is present for a predetermined time or more in a part of the first traveling path, based on the detection result of the detecting unit, wherein the path setting unit searches a second traveling path that is a path to bypass the part of the first traveling path, when it is determined that the person is present for a predetermined time or more in the part of the first traveling path, and the detecting unit limits the processing for the measurement result of the sensor, whose measurement target is the part of the first traveling path, after the second traveling path is searched.

The detecting unit may count the number of times the processing is limited for the measurement result of the sensor, whose measurement target is the part of the first traveling path, and the path setting unit may set a path to bypass the part of the first traveling path, in a period in which the number of times counted satisfies a predetermined condition, without setting the first path.

The vehicle may have an automatic driving function, the server may include a prohibiting unit configured to instruct the prohibition of the traveling the first traveling path by the automatic driving function to the vehicle, if there is no path corresponding to the second traveling path, and the detecting unit may limit the processing for the measurement result of the sensor, whose measurement target is the part of the first traveling path, after the prohibiting unit instructing the prohibition of the first traveling path to the vehicle.

Embodiments of present disclosure is not limited to the embodiments described above. Various embodiments can be appropriately modified to the extent that it does not deviate from the summary or philosophy of the embodiments described herein that can be read from the scope of the claims and the entire description. Driving support servers and systems with such modifications are also included within the technical scope of the present invention.

What is claimed is:

1. A driving support server for supporting a traveling of a vehicle to enter a parking space of a parking lot or to move out from the parking space, the driving support server comprising:
   a path setting unit configured to set a first traveling path, in which the vehicle travels, in the parking lot;
   a detecting unit configured to detect a person by performing processing on a measurement result of one or more sensors provided in the parking lot; and
   a determining unit configured to determine whether or not a person is present for a predetermined time or more in a part of the first traveling path, based on a detection result of the detecting unit,
   wherein the path setting unit searches for a second traveling path that is a path bypassing the part of the first traveling path when it is determined that a person is present in the part of the first traveling path for the predetermined time or more, and
   the detecting unit limits the processing for the measurement result of the sensor, whose measurement target is the part of the first traveling path, after the second traveling path is searched.

2. The driving support server according to claim 1, wherein the detecting unit counts the number of times that the processing is limited for the measurement result of the sensor, whose measurement target is the part of the first traveling path, and
   wherein the path setting unit sets a path for bypassing the part of the first traveling path without setting the first path in a period in which the counted number satisfies a predetermined condition.

3. The driving support server according to claim 1, wherein the vehicle has an automatic driving function,
   wherein the driving support server includes a prohibiting unit configured to instruct a prohibition of a traveling of the first traveling path by the automatic driving function to the vehicle when there is no path corresponding to the second traveling path,
   wherein the detecting unit limits the processing for the measurement result of the sensor, whose measurement target is the part of the first traveling path, after the prohibiting unit instructing the prohibition of the traveling of the first traveling path to the vehicle.

4. The driving support server according to claim 2, wherein the vehicle has an automatic driving function,
   wherein the driving support server includes a prohibiting unit configured to instruct a prohibition of a traveling of the first traveling path by the automatic driving function to the vehicle when there is no path corresponding to the second traveling path,
   wherein the detecting unit limits the processing for the measurement result of the sensor, whose measurement target is the part of the first traveling path, after the prohibiting unit instructing the prohibition of the traveling of the first traveling path to the vehicle.

5. A driving support system for supporting a traveling of a vehicle to enter a parking space of the parking lot or to move out from the parking space, the driving support system comprising:
   one or more sensors provided in the parking lot; and
   a server,
   the server includes
   a path setting unit configured to set a first traveling path, in which the vehicle travels, in the parking lot,
   a detecting unit configured to detect a person by performing processing on a measurement result of the one or more sensors, and
   a determining unit configured to determine whether or not a person is present for a predetermined time or more in a part of the first traveling path, based on the detection result of the detecting unit,
   wherein the path setting unit searches a second traveling path that is a path that bypasses the part of the first traveling path, when it is determined that a person is present for a predetermined time or more in the part of the first traveling path, and
   the detecting unit limits the processing for the measurement result of the sensor, whose measurement target is the part of the first traveling path, after the second traveling path is searched.

6. The driving support system according to claim 5, wherein the detecting unit counts the number of times the processing is limited for the measurement result of the sensor, whose measurement target is the part of the first traveling path,
   wherein the path setting unit sets a path to bypass the part of the first traveling path without setting the first path, in a period in which the number of times counted satisfies a predetermined condition.

7. The driving support system according to claim 5, wherein the vehicle has an automatic driving function,
   wherein the server includes a prohibiting unit configured to instruct a prohibition of a traveling of the first traveling path by the automatic driving function to the vehicle, when there is no path corresponding to the second traveling path,
   wherein the detecting unit limits the processing for the measurement result of the sensor, whose measurement target is the part of the first traveling path, after the prohibiting unit instructs the prohibition of the first traveling path to the vehicle.

8. The driving support system according to claim 6, wherein the vehicle has an automatic driving function,
   wherein the server includes a prohibiting unit configured to instruct a prohibition of a traveling of the first traveling path by the automatic driving function to the vehicle, when there is no path corresponding to the second traveling path, wherein the detecting unit limits the processing for the measurement result of the sensor, whose measurement target is the part of the first traveling path, after the prohibiting unit instructs the prohibition of the first traveling path to the vehicle.

* * * * *